(12) United States Patent
Uratani et al.

(10) Patent No.: US 9,322,743 B2
(45) Date of Patent: Apr. 26, 2016

(54) TEST SYSTEM

(71) Applicant: HORIBA, Ltd., Kyoto (JP)

(72) Inventors: Katsumi Uratani, Kyoto (JP); Katsuhiro Hachiuma, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 0 days.

(21) Appl. No.: 13/898,781

(22) Filed: May 21, 2013

(65) Prior Publication Data
US 2013/0325248 A1 Dec. 5, 2013

(30) Foreign Application Priority Data

May 23, 2012 (JP) .................... 2012-118093

(51) Int. Cl.
*G01M 17/00* (2006.01)
*G01M 17/007* (2006.01)

(52) U.S. Cl.
CPC ............ *G01M 17/00* (2013.01); *G01M 17/007* (2013.01)

(58) Field of Classification Search
CPC .................................................... G01M 17/00
USPC ................. 701/31.4, 31.5, 408, 41; 455/12.1, 455/186.1
See application file for complete search history.

(56) References Cited

U.S. PATENT DOCUMENTS

| | | | | |
|---|---|---|---|---|
| 6,847,892 B2* | 1/2005 | Zhou | ...................... | G01S 5/0027 340/426.1 |
| 6,895,310 B1* | 5/2005 | Kolls | .................. | G01M 17/007 341/123 |
| 6,941,202 B2* | 9/2005 | Wilson | .................... | G01D 9/005 340/572.1 |
| 6,944,430 B2* | 9/2005 | Berstis | ................. | G11B 27/002 369/30.08 |
| 8,682,509 B2* | 3/2014 | Goodrich | ........... | G05B 23/0283 340/10.1 |
| 2005/0038581 A1* | 2/2005 | Kapolka | ................ | G07C 5/008 701/31.4 |
| 2005/0102074 A1* | 5/2005 | Kolls | ..................... | B60R 25/04 701/31.4 |
| 2005/0125117 A1* | 6/2005 | Breed | .................... | G07C 5/008 701/31.5 |
| 2005/0234622 A1* | 10/2005 | Pillar | ..................... | A62C 27/00 701/41 |
| 2005/0250440 A1* | 11/2005 | Zhou | ..................... | G01S 5/0027 455/12.1 |
| 2005/0273218 A1* | 12/2005 | Breed et al. | ....................... | 701/2 |
| 2013/0325248 A1* | 12/2013 | Uratani | ................ | G01M 17/00 701/31.4 |

FOREIGN PATENT DOCUMENTS

| | | |
|---|---|---|
| JP | 05-008186 | 1/1993 |
| JP | 2005049353 | 2/2005 |
| JP | 2009-168730 | 7/2009 |
| JP | 2011-043403 | 3/2011 |

OTHER PUBLICATIONS

Hiroshi Kawamura, Automotive Development and Progress in Horiba's Emission Measurement Technologies, Readout, No. 34, Jan. 31, 2009, pp. 44-49.

(Continued)

*Primary Examiner* — Thomas G Black
*Assistant Examiner* — Wae Louie
(74) *Attorney, Agent, or Firm* — Brooks Kushman P.C.

(57) ABSTRACT

This invention is a test system 1 that is used for a mobile object such as a vehicle or a component used for the mobile object, and the test system 1 comprises one or a plurality of devices for test 4 used for a test and a device administrating device 7 that is connected to the device for test 4 in a communicable manner and that administrates the device for test 4, and is characterized by that the device administrating device 7 or the device for test 4 comprises a QC storing part 45 that stores a regulation ID to identify a regulation for the test and a quality check time or item to be provided for the device for test 4 in a mutually associated manner.

4 Claims, 8 Drawing Sheets

(56) References Cited

OTHER PUBLICATIONS

Horiba Automotive Test Systems, MEXA-7000 Version 3, May 2006, pp. 1-8, http://www.horiba.com/jp/automotive-test-systems/products/emissionmeasurement-systems/dilution-sampling-systems/details/mexa-7000-version-3-930/.

Office Action dated Dec. 9, 2014 issued in Japanese patent application No. 2012-118093, 3 pgs.

* cited by examiner

Quality Check Notification Setting

MEXA-ONE-                                Regulation : CFR1065

| ID | Name | Days of Interval | Days of Precaution | | |
|---|---|---|---|---|---|
| QC1-1 | ANA Linearize Check | 185 | 10 | Detail | |
| QC1-2 | Analyzer Response Time Check | 370 | 10 | Detail | |
| QC1-3-2 | Analyzer Linearity Check(CFR-1065) | 35 | 5 | Detail | |
| QC1-3-2 | Analyzer Performance Check(CFR-1065) | 370 | 10 | Detail | |
| QC2-1-2 | NDIR Interference Check(CO(L))(CFR-1065) | 370 | 10 | Detail | |
| QC2-1-2 | NDIR Interference Check(CO(H))(CFR-1065) | 370 | 10 | Detail | |
| QC2-1-2 | NDIR Interference Check(CO2)(CFR-1065) | 370 | 10 | Detail | |

Apply    Close

FIG. 4

Quality Check Notification Setting

MEXA-ONE-                                    Regulation : CFR1065

| ID | Name | Days of Interval | Days of Precaution | |
|---|---|---|---|---|
| QC4-1-2 | FID O2 Interference Check(CFR-1065) | 370 | 10 | Detail |
| QC4-3-2 | FID Response Factor Check(CFR-1065) | 370 | 10 | Detail |
| QC5-1-2 | NMC Efficiency Check(CFR-1065) | 185 | 10 | Detail |
| QC7-1 | NOx Converter Efficiency Check | 35 | 5 | Detail |
| QC7-2-2 | CLD CO2 and H2O Quench Check(CFR-1065) | 370 | 10 | Detail |
| QC8-1 | Pyro Interference Check | 370 | 10 | Detail |
| QC10-1-2 | Line Response Time Check(CFR-1065) | 370 | 10 | Detail |

Apply     Close

FIG. 5

| MEXA-ONE- | Quality Check Notification Setting | | | |
|---|---|---|---|---|
| | | Regulation : CFR1065 | | |
| ID | Name | Days of Interval | Days of Precaution | |
| QC5-1-2 | NMC Efficiency Check(CFR-1065) | 185 | 10 | Detail |
| QC7-1 | NOx Converter Efficiency Check | 35 | 5 | Detail |
| QC7-2-2 | CLD CO2 and H2O Quench Check(CFR-1065) | 370 | 10 | Detail |
| QC8-1 | Pyro Interference Check | 370 | 10 | Detail |
| QC10-1-2 | Line Response Time Check(CFR-1065) | 370 | 10 | Detail |
| QC11-1-2 | Temp. Linearity Check(CFR-1065) | 370 | 10 | Detail |
| QC11-2-2 | Pres. Linearity Check(CFR-1065) | 370 | 10 | Detail |

Apply    Close

Quality Check Notification Setting

MEXA-ONE- 92

Regulation : Standard

| ID | Name | Days of Interval | Days of Precaution | |
|---|---|---|---|---|
| QC1-1 | ANA Linearize Check | 185 | 10 | Detail |
| QC1-2 | Analyzer Response Time Check | 370 | 10 | Detail |
| QC2-1-1 | NDIR Interference Check(CO(L))(Standard) | 370 | 10 | Detail |
| QC5-1-1 | NMC Efficiency Check(Standard) | 185 | 10 | Detail |
| QC7-1 | NOx Converter Efficiency Check | 35 | 5 | Detail |
| QC7-2-1 | CLD CO2 and H2O Quench Check(Standard) | 370 | 10 | Detail |
| QC8-1 | Pyro Interference Check | 370 | 10 | Detail |

Apply    Close

Quality Check Notification Setting

MEXA-ONE-  Regulation: Standard

| ID | Name | Days of Interval | Days of Precaution | |
|---|---|---|---|---|
| QC1-2 | Analyzer Response Time Check | 370 | 10 | Detail |
| QC2-1-1 | NDIR Interference Check(CO(L))(Standard) | 370 | 10 | Detail |
| QC5-1-1 | NMC Efficiency Check(Standard) | 185 | 10 | Detail |
| QC7-1 | NOx Converter Efficiency Check | 35 | 5 | Detail |
| QC7-2-1 | CLD CO2 and H2O Quench Check(Standard) | 370 | 10 | Detail |
| QC8-1 | Pyro Interference Check | 370 | 10 | Detail |
| QC10-1-1 | Line Response Time Check(Standard) | 370 | 10 | Detail |

Apply    Close

FIG. 8

TEST SYSTEM

CROSS-REFERENCE TO RELATED APPLICATION

This application claims priority to JP Application No. 2012-118093, filed on May 23, 2012, the disclosure of which is incorporated in its entirety by reference herein.

FIELD OF THE ART

This invention relates to a test system to test a mobile object itself such as a vehicle, a ship or an airplane, and a component such as an internal combustion engine used for the mobile object.

BACKGROUND ART

Conventionally known is an automobile test system wherein a plurality of measurement devices are connected to a single measurement administrating device and the measurement devices are administrated by the administrating device. In addition, as shown in Japanese Unexamined Patent Application Publication No. 2005-49353, a scheduler is arranged above the administrating device and a test schedule is determined by the scheduler.

DISCLOSURE OF THE INVENTION

Problems to be Solved by the Invention

For this kind of the test system, an operator sets and administrates a term of an item (hereinafter also called as a QC term or the like) to which a quality check is provided for the measurement device by the use of the administrating device.

Meanwhile, there is a case that the above-mentioned QC term or the like is changed according to a regulation (for example, a CFR1065 mode, a standard mode determined by an operator based on the law.

However, with the conventional test system, if the QC term or the like is changed and set when the regulation is changed to another regulation, a past QC term or the like is deleted. As a result, when the regulation is returned to the former regulation that is the regulation before the change, it is necessary to input the QC term or the like again. In other words, it is not possible to reuse the QC term or the like that has been set in the past so that there is a problem that an operation of setting the QC term becomes complicated. This problem is not limited to the test system of the automobile but common to the test system of other moving body or its constituting devices.

The present claimed invention intends to solve all of the problems and since the quality check term or item can be administrated for every regulation, when a test is conducted with a regulation changed to another regulation, a main object of this invention is to make it possible to call up and reuse the quality check term or item that has been set for the previous regulation and to facilitate an operation of setting the quality check term or item.

Means to Solve the Problems

More specifically, a test system in accordance with this invention is to test an object to be tested with a mobile object such as a vehicle, a ship or an airplane, or a component used for the mobile object being as the object to be tested, and is characterized by comprising one or a plurality of devices for test used for the test and a device administrating device that is connected to the device for test in a communicable manner and that administrates the device for test are comprised, wherein a QC storing part that stores a regulation ID to identify a regulation for the test and a quality check time or item to be provided for the device for test in a mutually associated manner is provided for the device administrating device or the device for test. "Quality check" here includes a function inspection of each part of the analysis unit, a leakage inspection of piping and a pump performance check.

In accordance with this arrangement, since the quality check term or item can be administrated for every regulation, when a test is conducted with a regulation changed to another regulation, it is possible to call up and reuse the quality check term or item that has been set for the previous regulation. As a result of this, it is possible to facilitate an operation of setting the quality check term or item. The regulation includes not only a regulation based on the law but also a regulation independently specified by an operator.

In order to make it possible to easily grasp the quality check term or item corresponding to the regulation, it is preferable that the device administrating device comprises a regulation receiving part that receives designation of the regulation and a display part that obtains the quality check time or item corresponding to the regulation received by the regulation receiving part and displays the obtained quality check time or item.

In order to make it possible to facilitate usability by reflecting a change of the quality check term or item sequentially, it is preferable that the device administrating device further comprises a quality check set receiving part that receives an input for changing the quality check time or item displayed by the display part and that reflects the changed input on the QC storing part.

In order to make it possible to grasp a next quality check initiation time for the device for test and to provide a periodic quality check securely for the device for test, and in order to make it possible for the device administrating device to accurately administrate the next quality check initiation time of the device for test even though the device for test is connected to any device administrating device, it is preferable that the device administrating device or the device for test further comprises a previous quality check completion time storing part that stores a previous quality check completion time as being a time when the quality check that is previously provided for the device for test is completed, and the device administrating device further comprises a next quality check initiation time calculating part that calculates a next quality check initiation time as being a time when the next quality check is initiated for the device for test by obtaining the quality check time from the QC storing part and by adding the obtained quality check time to the previous quality check completion time.

In order to facilitate usability by make it easy for the operator to intuitively recognize that the next quality check initiation times is approaching, it is preferable that the device administrating device further comprises an information set receiving part that receives an input of information for determining a previous warning issue time as being a time prior to the next quality check initiation time, and the device administrating device or the device for test further comprises a warning issue part that issues a warning that can be recognized by an operator at a time when the time reaches the previous warning issue time.

Effect of the Invention

In accordance with this invention having the above arrangement, since the quality check term or item can be administrated for every regulation, when a test is conducted with a regulation changed to another regulation, it is possible to call up and reuse the quality check term or item that has been set for the previous regulation. As a result of this, it is possible to facilitate an operation of setting the quality check term or item.

BRIEF DESCRIPTION OF THE DRAWINGS

FIG. 4 is a screen configuration diagram showing one example of a quality check period/item setting screen of this embodiment.

FIG. 5 is a screen configuration diagram showing one example of a quality check period/item setting screen of this embodiment.

FIG. 6 is a screen configuration diagram showing one example of a quality check period/item setting screen of this embodiment.

FIG. 7 is a screen configuration diagram showing one example of a quality check period/item setting screen of this embodiment.

FIG. 8 is a screen configuration diagram showing one example of a quality check period/item setting screen of this embodiment.

DETAILED DESCRIPTION

One embodiment of this invention will be explained with reference to drawings.

Figure 1:
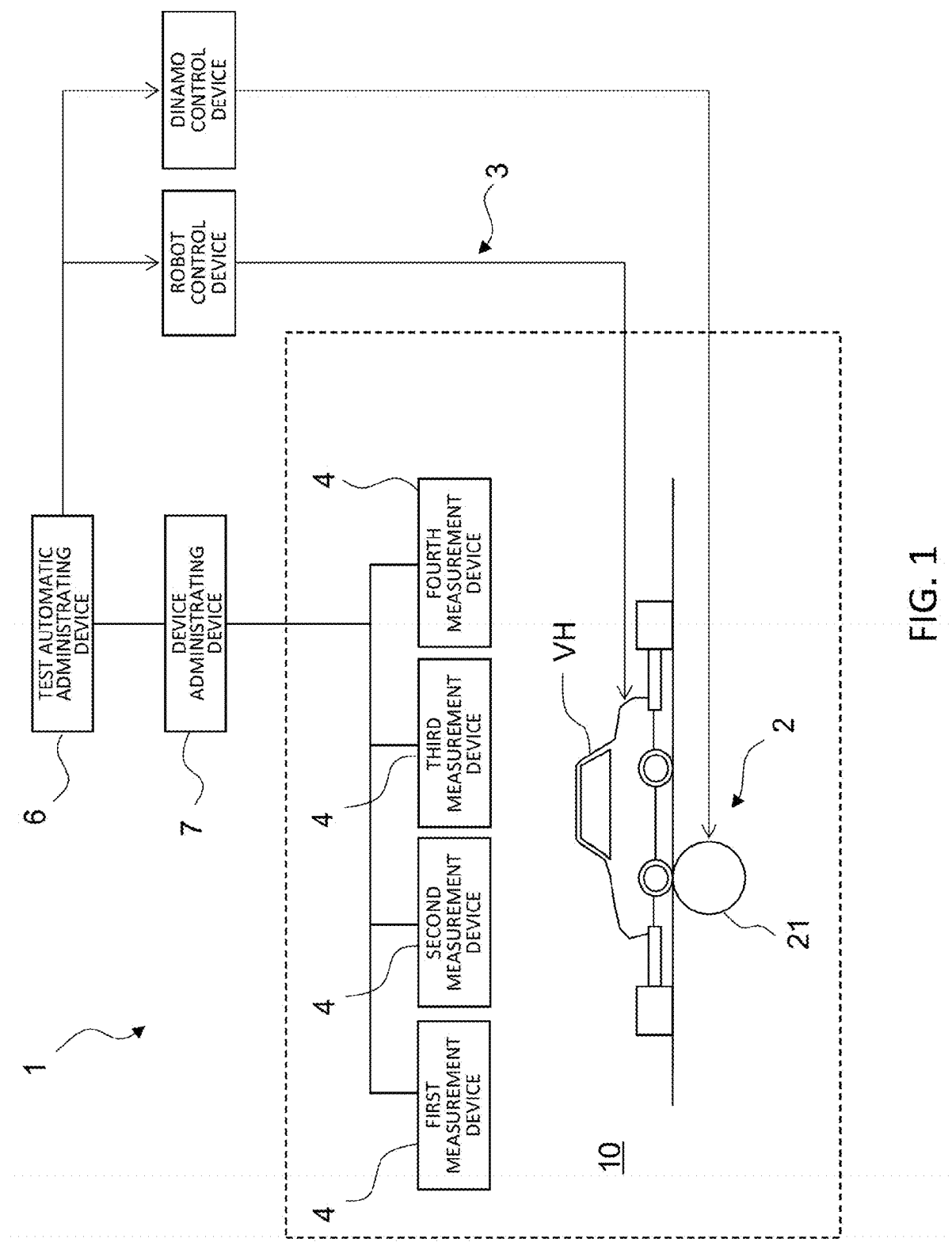
FIG. 1 is a schematic configuration diagram of a vehicle performance test system in accordance with one embodiment of this invention.

FIG. 1 schematically shows an overall view of a vehicle performance test system 1 in accordance with this embodiment. The vehicle performance test system 1 comprises a chassis dynamometer (not shown in drawings), an automatic driving device (not shown in drawings), a test automatic administrating device 6, a plurality of exhaust gas measurement devices 4 and a device administrating device 7 as shown in FIG. 1. The vehicle performance test system 1 makes a vehicle (VH) in a pseudo running state on the chassis dynamometer and the vehicle performance can be tested by measuring a mileage and an exhaust gas component of the vehicle (VH). The test can be conducted also on an engine alone. Each part will be explained.

Although a detailed explanation is omitted, the test automatic administrating device 6 has a fundamental function to set a schedule of a running test. To set the schedule of the running test includes, for example, to designate a regulation or to set a test date, and it may include to more finely set a behavior of the vehicle (VH) such as a speed or a rotation number of an engine and to set an object to be measured or a timing to conduct the measurement. The test automatic administrating device 6 is provided with a communication port and the measurement devices 4, the chassis dynamometer and the automatic driving device are connected to the automatic administrating device 6 in an inter-communicable manner by wire or wireless.

When the schedule setting is conducted by an operator, the test automatic administrating device 6 transmits a command according to the regulation to the chassis dynamometer, the automatic driving device and the device administrating device 7 and controls the chassis dynamometer, the automatic driving device and the device administrating device 7 so as to automatically conduct the test according to the regulation.

A single device administrating device 7 is connected to a single test automatic administrating device 6 in FIG. 1, however, a plurality of device administrating devices 7 may be connected to the test automatic administrating device 6. It is possible for the test automatic administrating device 6 to conduct scheduling independently for each of the device administrating devices 7.

The exhaust gas measurement device 4 (hereinafter also called as a measurement device 4) is connected to the device administrating device 7 in a communicable manner, and comprises one or more analysis units (not shown in drawings). For example, the exhaust gas measurement device 4 comprises, a first measurement device 4 wherein a plurality of gas analysis units whose measurement principle differs each other are incorporated, a second measurement device 4 as being a constant volume sampling meter, a third measurement device 4 as being an EGR meter and a forth measurement device 4 as being a catalyst measurement meter. The gas analysis unit is provided with, for example, an FIR for measuring THC, a CLD for measuring $NO_x$ or an NDIR for measuring $CO_2$.

Each of the measurement devices 4 measures each component amount of HC, $NO_x$, CO, $CO_2$ in accordance with a gas sampled through a sampling pipe (LD), and also calculates a performance value, for example, a mileage or an EGR ratio of devices such as the engine or a catalyst constituting the vehicle (VH) based on the measurement value.

Figure 2:
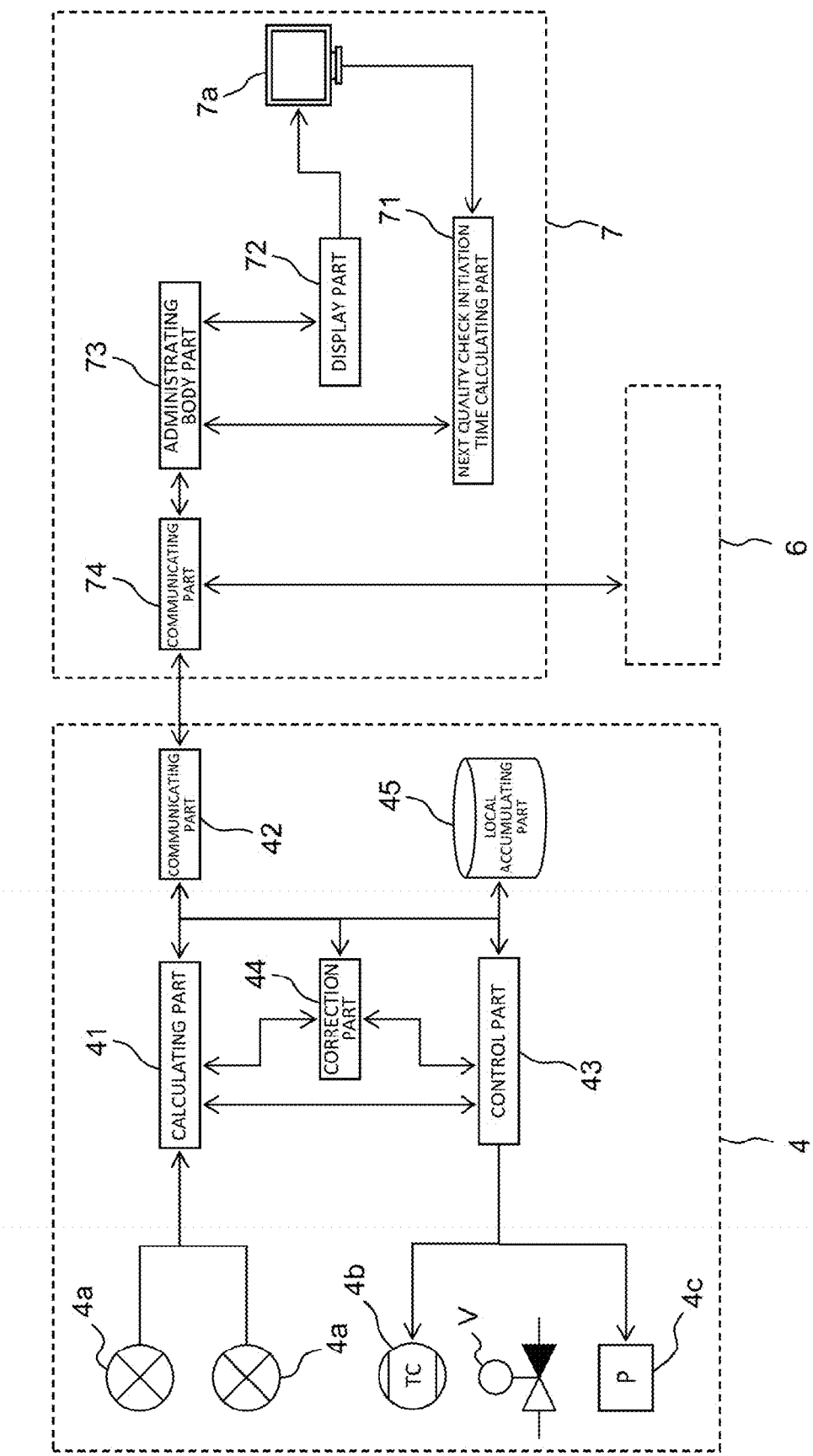
FIG. 2 is a function block diagram of a measurement device and a device administrating device of this embodiment.

In order to calculate the performance value, as shown in FIG. 2, each of the measurement devices 4 incorporates a local computer in addition to a sensor 4a for measurement that is arranged for each of the analysis units.

The local computer comprises a CPU, a memory, an A/D converter and a communication interface. The local computer calculates a measurement value indicating each component amount by conducting compensation or correction on an output value from each sensor 4a and produces functions as a calculating part 41 that calculates the performance value of the above-mentioned device based on the measurement value and a communicating part 42 that transmits the measurement value calculated by the calculating part 41 and the performance value of the device to the device administrating device 7 according to a predetermined protocol.

In addition, the local computer further comprises a control part 43 controls an operating mode (a measurement mode, a correction mode and a purge mode or the like) or a state mode (a sleep mode or a standby mode or the like) of the exhaust gas measurement device 4 by controlling a valve (V), a temperature adjusting mechanism 4b and a pump 4c by receiving a instruction signal from the device administrating device 7, a correction part 44 that corrects the sensor 4a, or a local accumulating part 45 that is arranged in a predetermined area of the memory and that serially obtains device state information of the measurement device 4 ranging from a past to the present and stores the obtained information.

The device state information is, for example, pump pressure information indicating a sucking pressure by an incorporated pump 4c, sensitivity information as being information concerning sensitivity of the sensor 4a, accumulated operation hour information indicating an accumulated operation hour of each part, and inspection time specifying information to specify a preliminarily determined inspection time of the measurement device 4. Some of the device state information is obtained from a result of a correction (a zero point compensation, a span compensation, transformation compensation) provided for the measurement device 4 or a quality check (a function inspection of each part of the analysis unit, a pipe leak inspection, a pump performance check or the like). In addition, the inspection time specifying information includes information indicating a previous quality check completion time as being a time when the quality check that has been previously provided for the measurement device 4 is completed.

The device administrating device 7 is configured by installing predetermined programs on a general-purpose computer, and comprises a CPU, a memory, a display, an input device (a keyboard, a mouse or the like) and a communication interface or the like. As shown in FIG. 2, the device administrating device 7 produces functions as a next quality check initiation time calculating part 71, a display part (a warning issue part) 72, an administrating body part (a regulation receiving part, a quality check set receiving part and an information set receiving part) 73, a communicating part 74 or the like by cooperating the CPU and its peripheral devices based on programs stored in the memory. The device administrating device 7 is provided with a communication port and the measurement device 4 is connected to the device administrating device 7 in an inter-communicable manner by wire or wireless.

Next, an operation of the device administrating device 7 will be explained and each part of the device administrating device 7 will be also explained.

First, the operator conducts various operations (piping or the like) in accordance with the measurement device 4, and then connects the measurement device 4 to the device administrating device 7 physically by the use of a connector cable.

A plug-in screen, not shown in drawings, is displayed as an initial screen on a display 7a of the device administrating device 7 by the function of the display part 72. The plug-in screen is provided with a connection button for connecting the device administrating device 7 to the measurement device 4 and a disconnection button for disconnecting the measurement device 4.

When the operator clicks, for example, the connection button on the plug-in screen, the administrating body part 73 accesses the local accumulating part 45 of the corresponding measurement device 4 through the communication part 42, 74, and automatically obtains the device state information of the measurement device 4 accumulated in the local accumulating part 45 ranging from the past to the present.

Figure 3:
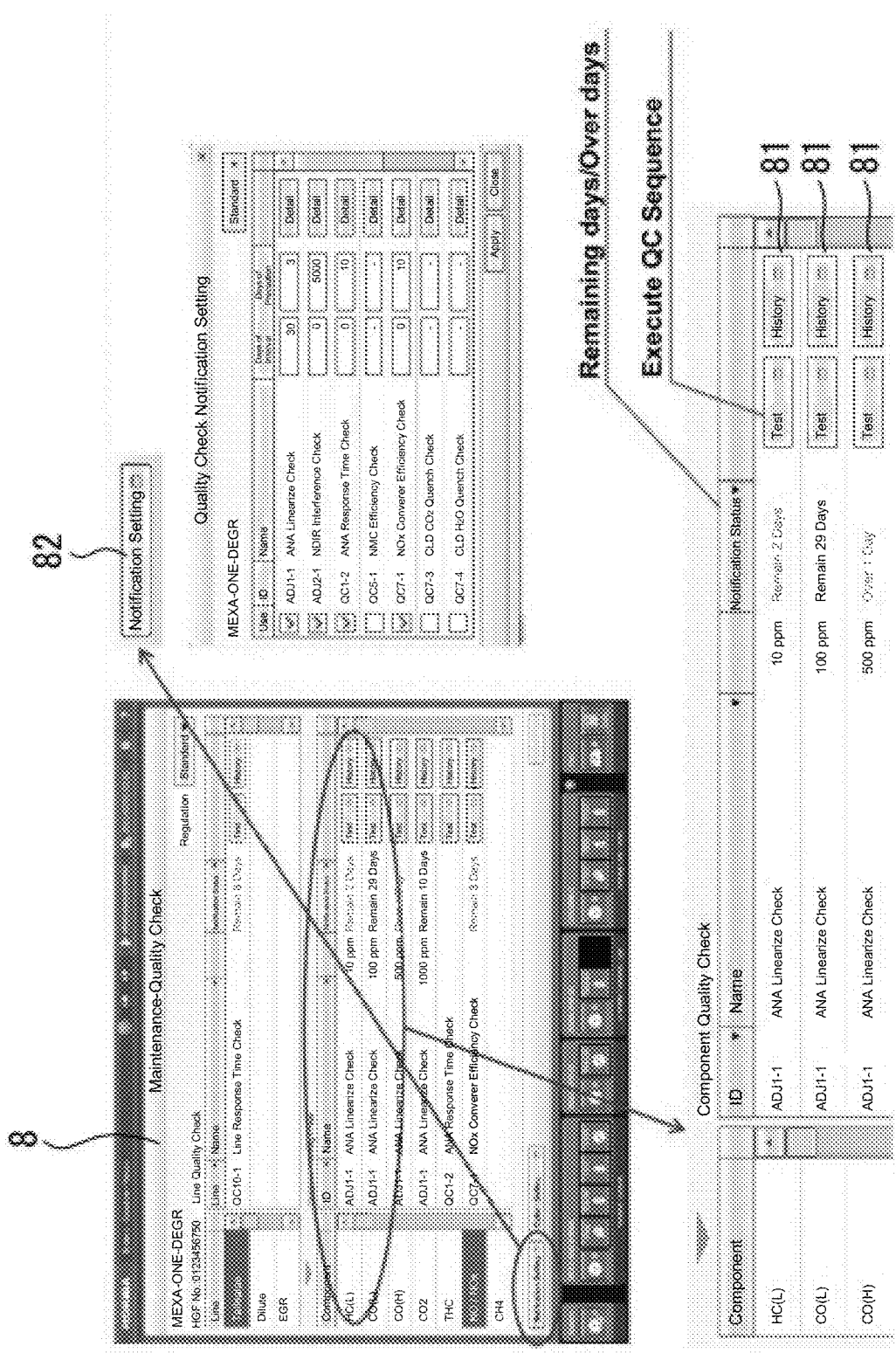
FIG. 3 is a screen configuration diagram showing one example of a warning screen.

Next, the operator makes an appropriate operation to display a warning screen 8 as shown in FIG. 3. The warning screen 8 displays items of each quality check in a tabular form. The warning screen 8 is provided with a display field "Notification Status" to display a number of remaining days (precaution issue time) until the next quality check. In this embodiment, an interval or an item to be a basis for calculating the number of remaining days until the next quality check is set for each regulation. Concretely, to set this, the operator pushes a "Notification Setting" button 82 arranged in the warning screen 8 so that the warning screen 8 is shifted to an interval/item setting screen. FIG. 4~FIG. 8 show an example of the interval/item setting screen.

As shown in FIG. 4~FIG. 6, the items of each quality check are displayed in a tabular form on each interval/item setting screen 9A~9C. Each of the interval/item setting screens 9A~9C is provided with a display field to display a quality check interval ("Days of Interval") provided for the measurement device 4 and a display field to display days of precaution ("Days of Precaution") for determining the number of the remaining days until the next quality check. Furthermore, each of the interval/item setting screens 9A~9C is provided with a designation button 92 for designating a kind of the regulation (a regulation ID in claims), a "Detail" button 93 for setting a further detailed setting (not shown in drawings), an "Apply" button 94 for saving each numerical value in the display field and a "Close" button 95 for closing the interval/item setting screen.

Each numerical value in the display field is preliminarily stored in the local accumulating part 45 in relationship to "CFR1065" as being the regulation ID indicating the kind of the regulation, and displayed by a loading operation from the local accumulating part 45 by the administrating body part 73. The above-mentioned each numerical value can be changed by an input for change by the operator. When the administrating body part 73 receives the input for change by the operator, the change is reflected in the local accumulating part 45. Then, when the administrating body part 73 receives a click operation of the "Apply" button 94 by the operator, the above-mentioned reflection is confirmed. Accordingly, in FIG. 4~FIG. 6, the numerical value after the reflection is stored in the local accumulating part 45 in relationship to the "CFR1065" as being the regulation ID.

Meanwhile, for example, in a state that the interval/item setting screen 9A is displayed, in case that the regulation "Standard" is designated by the operator, the administrating body part 73 accepts the designation. Then the display part 72 obtains the quality check interval or item corresponding to the regulation "Standard" from the local accumulating part 45, and displays either one of the interval/item setting screen 9D as shown in FIG. 7 and the interval/item setting screen 9E as shown in FIG. 8. In this embodiment, the same setting as that of the interval/item setting screen 9A~9C can be conducted also for the interval/item setting screens 9D and 9E.

For example, in a state that the interval/item setting screen 9D is displayed, in case that the "Close" button 95 is clicked by the operator, the administrating body part 73 accepts the click operation, closes the interval/item setting screen 9D and displays the above-mentioned warning screen 8. At this time, the next quality check initiation time calculating part 71 obtains the above-mentioned quality check interval from the above-mentioned local accumulating part 45, and calculates the next quality check initiation time by adding the obtained quality check interval to the above-mentioned previous time quality check completion time. The display part 72 displays the number of remaining days until the next quality check initiation time on the above-mentioned warning screen 8 based on the next quality check initiation time and the above-mentioned days of precaution. In this embodiment, the warning is displayed in two ways. Concretely, in case that the present date exceeds a date that is the number of remaining days before the next quality check initiation time, a precaution is displayed in orange. In case that the present date exceeds the next quality check initiation time, a warning is displayed in red.

In accordance with this embodiment having the above-mentioned arrangement, since the quality check term or item can be administrated for every regulation, when a test is conducted with a regulation changed to another regulation, it is possible to call up and reuse the quality check term or item that has been set for the previous regulation. As a result of this, it is possible to facilitate an operation of setting the quality check term or item.

In addition, since the next quality check initiation time calculating part 71 that calculates the next quality check initiation time is comprised, it is possible to grasp a next quality check initiation time for the measurement device 4 and to provide a periodic quality check securely for the measurement device 4.

In addition, since the display part 72 that issues the warning that can be recognized by the operator is comprised, it is possible for the operator to intuitively recognize that the next quality check initiation time is approaching so as to improve the usability.

Furthermore, since the previous quality check completion time of the measurement device 4 is stored in the local accumulating part 45 of the measurement device 4, even though the measurement device 4 is connected to any device administrating device 7, it is possible for the device administrating device 7 to accurately administrate the next quality check initiation time of the measurement device 4.

The embodiment of this invention is explained based on the drawings, however, it should be assumed that a concrete configuration is not limited to the above-mentioned embodiment. A scope of this invention is indicated not by the explanation but by the scope of claims, and all of the modifications within the meaning and the scope equivalent to those of the claims are included.

The present claimed invention is not limited to the above-mentioned embodiment.

For example, this test system can be applied also to a test of an engine alone, or a test of an airplane, a ship or its devices.

In the above-mentioned embodiment, an example is explained that the test automatic administrating device 6 transmits the command according to the regulation to the chassis dynamometer, the automatic driving device and the device administrating device 7, and administrates them so as to automatically conduct the test as scheduled, however, this invention is not limited to this. For example, the device administrating device 7 may transmit a command according to a regulation to each of the measurement devices 4. In addition, a local computer incorporated into the measurement device 4 may transmit a command according to a regulation to another measurement device 4.

In the above-mentioned embodiment, an example is explained that the quality check term/item setting screen 9A~9E is displayed on the display 7a of the device administrating device 7, however, this invention is not limited to this. For example, the quality check term/item setting screen 9A~9E may be displayed on a display of the test automatic administrating device 6.

In the above-mentioned embodiment, an example is explained that the warning screen 8 is displayed on the display 7a of the device administrating device 7, however, this invention is not limited to this. For example, the warning screen 8 may be displayed on a display of the test automatic administrating device 6. In addition, a blinking lamp may be provided for each of the measurement devices 4 and a warning that can be recognized by the operator may be issued by blinking the lamp.

In the above-mentioned embodiment, an example is explained that the previous quality check completion time of the measurement device 4 is stored in the local accumulating part 45 of the measurement device 4, however, this invention is not limited to this. For example, the previous quality check completion time of the measurement device 4 may be stored in the memory of the device administrating device 7. In addition, for example, a plurality of device administrating devices 7 may be connected in a communicable manner by wire or non-wired and the previous quality check completion time of the measurement device 4 may be stored in a storing part that can be shared by each of the device administrating devices 7.

In the above-mentioned embodiment, a quality check item may be added or deleted on each of the quality check term/item setting screen 9A~9E.

In the above-mentioned embodiment, an example is explained that the administrating body part 73 accepts the input operation from the operator and designates the regulation ID or sets the quality check term or item, however, this invention is not limited to this. For example, the administrating body part 73 may accept a command from the test automatic administrating device 6 and designate the regulation ID or set the quality check term or item.

In the above-mentioned embodiment, an example is explained that the QC storing part is provided in the measurement device 4 side, however, this invention is not limited to this. For example, the QC storing part may be provided in the device administrating device 7 side. In this case, in order to make it possible for the device administrating device 7 side to identify the measurement device 4, it is necessary to store the quality check term or item in association with the identification ID of the measurement device 4 in the QC storing part.

EXPLANATION OF CODES

1 . . . vehicle performance test system (test system)
4 . . . measurement device (device for test)
7 . . . device administrating device
45 . . . local accumulating part (QC storing part and previous quality check completion time storing part)
71 . . . next quality check initiation time calculating part
72 . . . display part (warning issue part)
73 . . . administrating body part (regulation receiving part, quality check set receiving part and information set receiving part)
VH . . . vehicle (moving body)

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A test system to test a vehicle, a component of the vehicle, or an internal combustion engine by measuring components in sampled exhaust gas of the vehicle or the internal combusting engine, the system comprising:
one or a plurality of exhaust gas measuring devices for measuring the components during a test and a device administrating device that is connected to the one or the plurality of exhaust gas measuring devices in a communicable manner and that administrates the one or the plurality of exhaust gas measurement devices, wherein for each of the vehicle, the component of the vehicle, or the internal combustion engine, the test system is configured to be changed to a different set of regulations relevant to the test, and to perform the test according to the set of regulations relevant to the test; and
a QC storing part that stores a regulation ID to identify the set of regulations relevant to the test and a quality check time to be provided for the one or the plurality of exhaust gas measurement devices in a mutually associated manner, wherein the device administrating device or the one or the plurality of exhaust gas measurement devices further comprises a previous quality check completion time storing part that stores a previous quality check completion time as being a time when a quality check that is previously provided for the one or the plurality of exhaust gas measurement devices is completed, and wherein the device administrating device further comprises a next quality check initiation time calculating part that calculates a next quality check initiation time as being a time when a next quality check is initiated for the one or the plurality of exhaust gas measurement devices by obtaining the quality check time from the QC storing part and by adding the quality check time from the QC storing part to the previous quality check completion time.

2. The test system described in claim 1, wherein the device administrating device further comprises a regulation receiving part that receives designation of the set of regulations relevant to the test, and a display part that obtains the quality check time corresponding to the set of regulations relevant to the test received by the regulation receiving part and displays the quality check time corresponding to the set of regulations relevant to the test received by the regulation receiving part.

3. The test system described in claim 2, wherein the device administrating device further comprises a quality check set receiving part that receives an input for changing the quality check time displayed by the display part and that reflects the changed input on the QC storing part.

4. The test system described in claim 1, wherein the device administrating device further comprises an information set receiving part that receives an input of information for determining a pre-check warning issue time as being a time prior to the next quality check initiation time, and wherein the device administrating device or the one or the plurality of exhaust gas measurement devices further comprises a warning issue part that issues a pre-check warning at the pre-check warning issue time to warn an operator.

* * * * *